United States Patent [19]

Swain

[11] Patent Number: 4,793,306
[45] Date of Patent: Dec. 27, 1988

[54] AIR FLOW MANAGEMENT IN AN INTERNAL COMBUSTION ENGINE THROUGH THE USE OF ELECTRONICALLY CONTROLLED AIR JETS

[75] Inventor: Michael R. Swain, Miami, Fla.

[73] Assignee: University of Miami, Coral Gables, Fla.

[21] Appl. No.: 942,458

[22] Filed: Dec. 16, 1986

[51] Int. Cl.$^4$ ............................................. F02M 23/04
[52] U.S. Cl. ..................................... 123/308; 123/585
[58] Field of Search ................ 123/306, 308, 432, 585

[56] References Cited

U.S. PATENT DOCUMENTS

| | | | |
|---|---|---|---|
| 3,043,286 | 7/1962 | Blomberg | 123/585 |
| 4,196,701 | 4/1980 | Tamura et al. | 123/308 |
| 4,278,063 | 7/1981 | Nakamura et al. | 123/432 X |
| 4,351,298 | 9/1982 | Franke | 123/308 X |

FOREIGN PATENT DOCUMENTS

| | | | |
|---|---|---|---|
| 3126250 | 1/1983 | Fed. Rep. of Germany | 123/585 |
| 155219 | 9/1983 | Japan | 123/585 |
| 30418 | 2/1985 | Japan | 123/585 |

OTHER PUBLICATIONS

"Electronic Engine Control-Trends Outlined", *Automotive Engineering*, vol. 94, No. 8, Aug. 1986, pp. 46–54.
SAE article No. 851210, "NOx Reduction is Compatible with Fuel Economy Through Toyota's Lean Combustion System" by Kimbara et al.

*Primary Examiner*—Tony M. Argenbright
*Attorney, Agent, or Firm*—Hedman, Gibson, Costigan & Hoare

[57] ABSTRACT

An air inlet nozzle is mounted in a valve pocket above the intake valve of a combustion chamber to allow high speed airflow to mix with fuel in the pocket and enter the combustion chamber to create desired air swirl. Airflow through the nozzle is varied by a computer operated solenoid.

8 Claims, 2 Drawing Sheets

AIR FLOW MANAGEMENT IN AN INTERNAL COMBUSTION ENGINE THROUGH THE USE OF ELECTRONICALLY CONTROLLED AIR JETS

FIELD OF THE INVENTION

The present invention relates to an internal combustion engine, and specifically to a device for generating and controlling a flow of swirling air into the cylinders of an internal combustion engine to thereby promote combustion stability especially during periods of low torque output (i.e., light load operation).

BACKGROUND OF THE INVENTION

Much work is presently being done to produce air swirl in combustion chambers of an internal combustion engine. Air swirl is desirable in combustion engines because it promotes combustion stability, i.e., providing limited cycle to cycle variations of the air/fuel mixture and the air velocity profile in the cylinder, especially in the region of the cylinder proximate to the spark plug. As a result, the cylinders operate under similar firing conditions during each firing cycle especially at light load, or low torque output. This combustion stability allows a reduction in the lean operating limit of the internal combustion engine.

Prior to the present invention, efforts to produce air swirl have focused on redesigning the contour of the intake valve port opening into the combustion chamber by bringing the intake port closer to the engine block and forming a corkscrew shaped air intake path to the combustion chamber. Such efforts have proved disadvantageous because the opening of the intake valve port is fixed limiting the volume of air into the combustion chamber. As a result, the volume of air entering the combustion chamber during high RPM operation is less than that required to achieve maximum power output. This effect is known as reduced volumetric efficiency.

It is therefore a primary object of the present invention to provide a device for attaining high level combustion stability by producing a consistent air/fuel ratio and air swirl velocity profile in the cylinder, especially in the vicinity of the firing region of the spark plug, and especially under light load conditions by directing an air swirl int the combustion chamber of an internal combustion engine It is a further object of the present invention to provide means for obtaining increased peak power output during high RPM operating conditions without increasing engine displacement by increasing volumetric efficiency and thereby generating the desired air flow into the cylinders during both light and heavy load conditions.

It is another object of the present invention to facilitate air-fuel preparation by providing a high speed swirl of air in the path of the fuel supplied by the fuel injector thereby placing fewer design constraints upon the fuel injector.

SUMMARY OF THE INVENTION

The foregoing objects and other objects inherent from the following disclosure are accomplished by the present invention and method for use thereof.

The invention in its broadest aspect comprises a means for generating a swirling flow of air, in an air/fuel mixture, especially during light load operation, in the combustion chamber of an internal combustion engine having at least one intake valve for transmitting air into the combustion chamber, said means comprising a nozzle having at least one opening for receiving air and at least one expulsion opening for directing air into the combustion chamber with a pathway connecting said air receiving openings and expulsion openings, and means for controlling the flow of air through said pathway.

The nozzle described herein is positioned in a valve pocket which is located above the intake valve of the combustion chamber. The nozzle is positioned within the valve pocket such that the expulsion opening is at an acute angle with respect to the plane of the intake valve head. A high speed flow of air is generated through the pathway of the nozzle and is directed out the expulsion opening at said angle across the opening of the intake valve. This high speed air, which is mixed with fuel in the valve pocket, enters the combustion chamber creating the desired air swirl.

The means for controlling the air flow through the pathway of the nozzle comprises an electric solenoid which is movable from a fully opened position allowing maximum air flow to a closed position prohibiting the flow of air. The size of the opening of the pathway resulting from the movement of the solenoid is controlled by a computer which is programmed to determine the amount of air necessary for operation during existing load conditions based on torque demand (e.g., gas pedal position), tachometer reading and other factors commonly input into engine computers and known in the art to promote efficient combustion. Variation in power output during light load operation is achieved by variation in the size and duration of the pathway opening.

The computer controlled solenoid allows timed air flow through the pathway of air nozzle during the intake stroke of the engine. Positioning of the air nozzle at an angle with respect to the intake valve opening generates a high speed flow of air into the combustion chamber past the intake valve. The air swirl created by the gas motion during the intake stroke provides a consistent air/fuel mixture and swirl velocity profile within the cylinder, especially in vicinity of the spark plug, which maintains substantially similar conditions from cycle to cycle firing.

Air from the atmosphere is driven into and through the nozzle by the pressure differential between the pressure of ambient air entering the nozzle from the atmosphere and the pressure within the valve pocket connected to the intake manifold. The speed at which the air moves through the air nozzle and into the combustion chamber can be made to reach sonic velocity due to the above-described pressure differential and by controlling the duration and size of the pathway in the air nozzle by regulating the position of the solenoid. Air movement at sonic speeds also aids in atomizing the fuel which enters the cylinder from the fuel injector with the air especially when the fuel injector releases fuel into the path of the sonic air stream in the valve pocket.

During heavy load operation a customarily employed throttle plate opens the intake manifold to the atmosphere thereby providing sufficient air to the combustion chamber. Accordingly, the air nozzle may be largely bypassed as the main source of air flow into the combustion chamber by closing or reducing the size of air pathway by operation of the solenoid. Thus, the intake port, valve pocket and valve can be designed for high power output conditions (e.g., for high volumeric efficiency to enable a higher volume of air flow and increased power during high RPM conditions) without sacrificing efficiency during light load conditions.

DETAILED DESCRIPTION OF THE INVENTION

Figure 1:
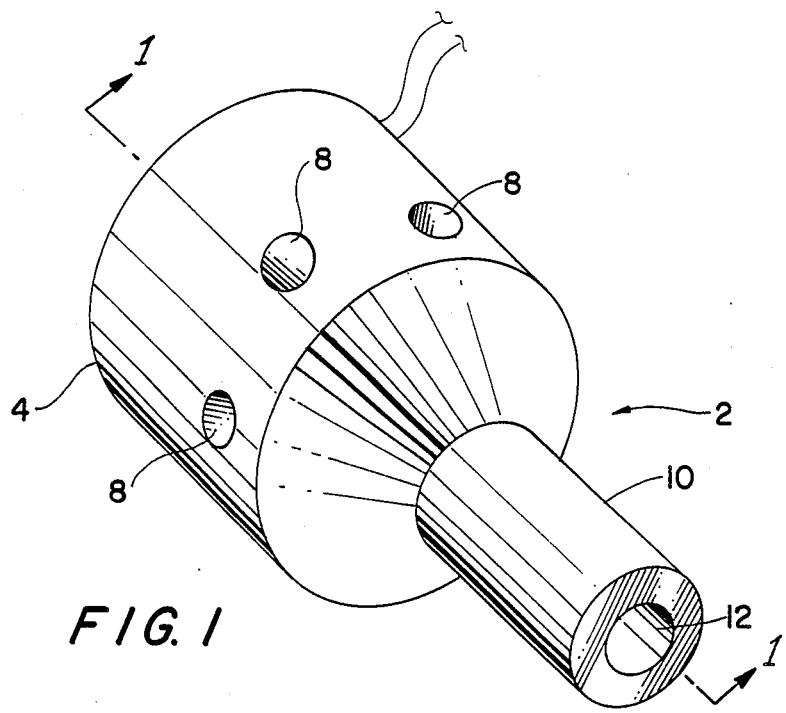
FIG. 1 is a perspective view of an air nozzle in accordance with the invention.

Referring to the drawings and specifically to FIG. 1, the means for creating an air swirl in the combustion chamber 30 of an internal combustion engine includes an air nozzle 2 having a body 4 having therein in at least one air receiving opening 8. The nozzle 2 also has a forward section 10 having at one end thereof at least one expulsion opening 12.

Figures 2A, 2B:
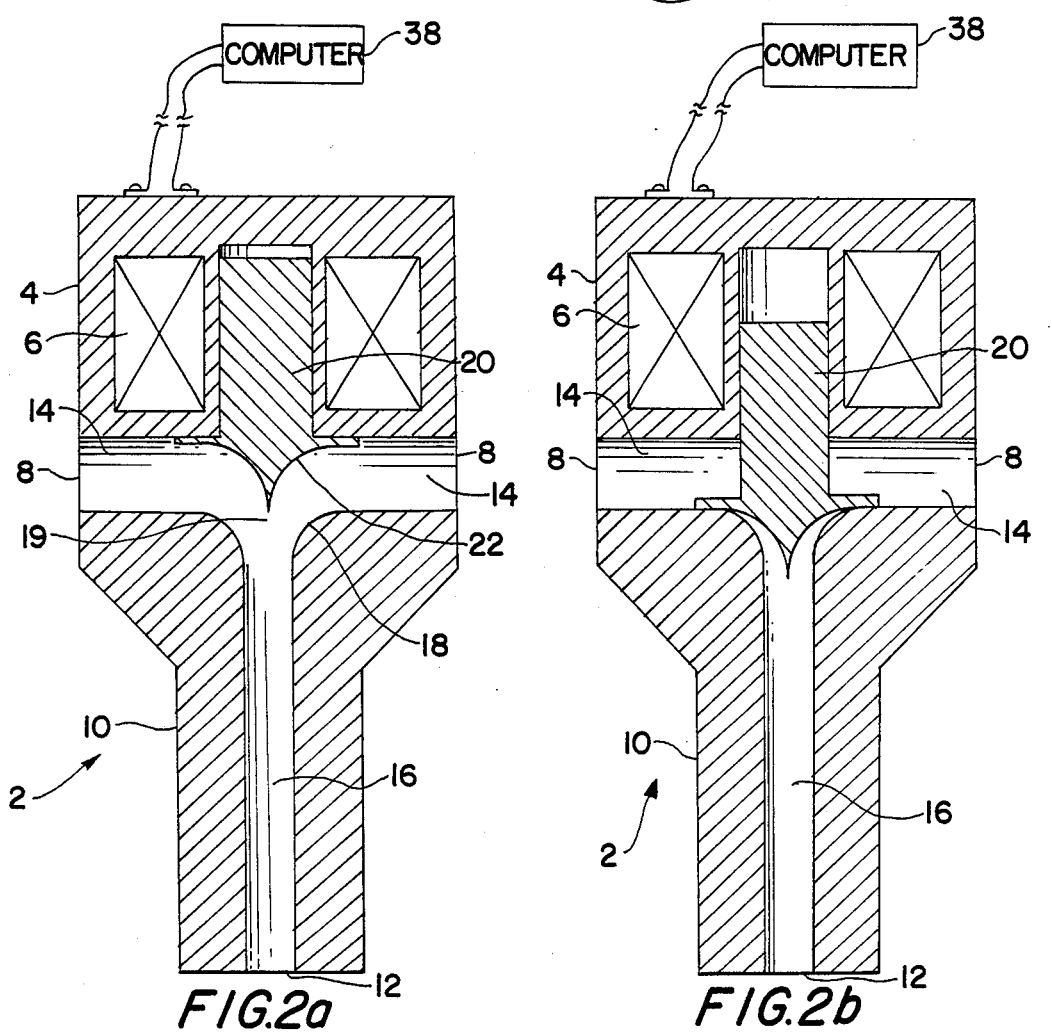
FIG. 2a is a cross-sectional view of the air nozzle and solenoid through line 1—1 of FIG. 1 showing the solenoid in the open position for maximum air flow.
FIG. 2b is a cross-sectional view of the air nozzle and solenoid through line 1—1 of FIG. 1 with the solenoid in the closed position for prohibiting air flow.

As shown in FIGS. 2a and 2b, the air receiving openings 8 open into contiguous pathways 14 which are connected to a common pathway 16 by contoured sides 18. The common pathway 16 terminate at an expulsion opening 12.

Figure 3:
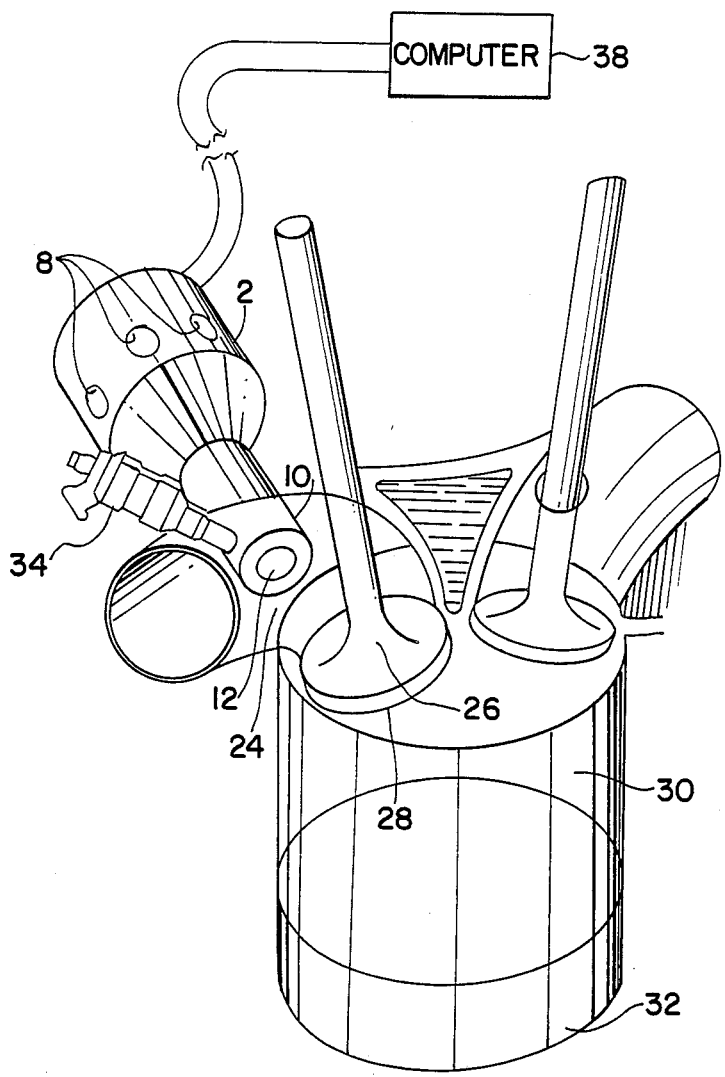
FIG. 3 is a plan view of the invention mounted in an internal combustion engine.

At least a portion of the forward section 10 of the nozzle 2 is within the valve pocket 24 lying above the intake valve seat 28 as shown in FIG. 3 and described hereinafter. The body 4 of the nozzle 2 including the air receiving openings 8 protrudes through the cylinder head and lies exterior thereto so as to draw air from the atmosphere.

As shown in FIG. 2a, the size of the junction 19 connecting pathways 14 and the common pathway 16 is controlled by a solenoid 6 which comprises a stopper 20 having contoured sides 22 and opposing contoured sides 18 defining the junction 19 of the pathways 14 and the common pathway 16.

The stopper 20 is movable from an open position as shown in FIG. 2a to a closed position as shown in FIG. 2b. Movement of the stopper 20 is controlled by a standard computer 38, which is programmed to respond to accelerator pedal position to adjust the air volume requirements needed within the combustion chamber 30 to reduce the lean operating limit and obtain optimum combustion stability.

In operation under light load conditions, the primary source of air into the combustion chamber 30 is through the nozzle 2. Specifically, air, being filtered as commonly known in the art, enters from the atmosphere into the air receiving openings 8 and passes through the pathways 14. The air is caused to flow into the common pathway 16 by the contour of the sides 18 at the junction 19 of the pathways 14 and common pathway 16. The air proceeds through the common pathway 16 where it exits at expulsion opening 12.

Referring to FIG. 2b, during heavy load operation where the primary source of air into the combustion chamber 30 is from the intake manifold and not the nozzle 2 of the present invention, the stopper 20 is moved to the closed position. In this position, the sides 22 of the stopper 20 are in sealed relationship with the sides 18 at the junction 19 thereby preventing the flow of air from the pathways 14 into the common pathway 16. As a result, there is little, if any, air exiting the expulsion opening 12.

Of course, the stopper 20 may be moved to any partially depressed position (i.e., between the open position shown in FIG. 2a and the closed position in FIG. 2b) to thereby monitor the flow of air into the combustion chamber 30. This enables the nozzle 2 to provide air swirl into the combustion chamber 30 in varying amounts depending on the parameters monitored by the computer 38.

Referring to FIG. 3, the nozzle 2 is positioned approximately perpendicular to a radial line crossing the cylinder bore, at an acute angle to the plane of the top of the cylinder. At least a portion of the forward section 10 of the nozzle 2 including the expulsion opening 12 are positioned within a valve pocket 24 leading to the upper portion of the combustion chamber 30. At the top of the combustion chamber 30 are intake valve seats 28 which provide an opening into the combustion chamber 30 from the valve pocket 24. When the valve 26 rises during the intake stroke of the engine, the intake valve seats 28 permit air from the valve pocket 24 provided by the nozzle 2 or the intake mainfold to enter into the combustion chamber 30. The air entering the valve pocket 24 is mixed with fuel exiting the discharge port of the fuel injector 34 in the valve pocket 24.

In operation under light load conditions the computer 38 signals the stopper 20 to rise so that air enters the air receiving openings 8 of the nozzle 2, flows through pathways 14 and the common pathway 16 and exits the expulsion opening 12 into the valve pocket 24 where the air is mixed with the fuel entering the valve pocket 24 from the fuel injector 34. At the same time, the valve 26 rises to permit the air/fuel mixture to enter the combustion chamber 30 past the intake valve seats 28. The expulsion opening 12 of the nozzle 2 is positioned in the valve pocket 24 at an acute angle with respect to the plane of the top of the cylinder. As a result, the air from expulsion opening 12 combines with the fuel from fuel injector 34 to create a high speed air/fuel flow which produces a swirl within the combustion chamber 30.

Once the air/fuel swirl enters the combustion chamber 30, the piston 32 rises compressing the mixture for ignition. Upon ignition the piston 32 is forced downward ready for the next cycle.

In heavy load operations requiring peak output, the stopper 20 is depressed preventing or substantially preventing the flow of air through the nozzle 2. The air needed for ignition in the combustion chamber 30 is supplied primarily from the intake manifold through the valve pocket 24.

It should be understood that the invention described in the drawings is capable of modification apparent to those skilled in the art. For example, the number of air receiving openings 8 and expulsion openings 12 may vary. The solenoid 6 may be of the fast acting electromagnetic type. The computer 38 may be programmed to control the size of the junction 19 within the nozzle based on torque demand, position of the gas pedal, engine RPM's, climatic conditions, etc. It is preferred that the stopper 20 be controlled in a manner in which the pressure at the air receiving openings 8 is about twice the pressure of the air exiting expulsion openings 12, representing a pressure ratio of 2:1 across the nozzle 2 during light load operation.

I claim:

1. In an internal combustion engine having at least one combustion chamber having at least one intake valve, means for producing an air/fuel mixture in the valve pocket and means for directing the air/fuel mixture past the intake valve into the combustion chamber, the improvement comprising a device for generating a swirling flow of said air/fuel mixture in said combustion chamber to thereby obtain greater combustion stability, said device comprising:

(a) a nozzle positioned within the valve pocket and directed at an acute angle toward the intake valve comprising at least one opening for receiving air, connected to a first pathway, and at least one opening for expelling air, connected, to a second pathway joined to the first pathway and extending to the expulsion opening, said first and second pathways providing a continuous channel for the flow of air from the air receiving opening to the expulsion opening wherein the first and second pathways are joined at a junction, said junction comprising a pair of opposed arcuate walls extending from the end of the first pathway remote from the air receiving opening to the end of the second pathway remote from the expulsion opening, through which the air travels from the expulsion opening past the intake valve into the combustion chamber; and (b) means for controlling the flow of air through the pathway and out the expulsion opening comprising:

(i) a stopper having sides complementary in shape to the pair of opposed arcuate walls movable from an open position allowing air through the pathway to a closed position wherein the sides of the stopper are in a sealed relationship with the opposed arcuate sides of the junction thereby preventing the flow of air through the second pathway and out of the expulsion opening; and (ii) an electronic computer which determines the size and duration of the pathway opening.

2. In an internal combustion engine having at least one combustion chamber having at least one intake valve, means for producing an air/fuel mixture in the valve pocket and means for directing the air/fuel mixture past the intake valve into the combustion chamber, the improvement comprising a device for generating a swirling flow of said air/fuel mixture in said combustion chamber to thereby obtain greater combustion stability, said device comprising:

(a) a nozzle comprising at least one opening for receiving air, at least one opening for expelling air positioned within the valve pocket and directed at an acute angle toward the intake valve, and a pathway connecting the air receiving opening and the expulsion opening through which the air travels from the expulsion opening past the intake valve and into the combustion chamber wherein the pressure of the air entering the air receiving opening is about twice the pressure of the air exiting the expulsion opening thereby creating air flow of sonic velocity exiting the expulsion opening; and (b) means for controlling the flow of air through the pathway and out the expulsion opening.

3. In an internal combustion engine having at least one combustion chamber having at least one intake valve, means for producing an air/fuel mixture in the valve pocket and means for directing the air/fuel mixture past the intake valve into the combustion chamber, the improvement comprising a device for generating a swirling flow of said air/fuel mixture in said combustion chamber to thereby obtain greater combustion stability, said device comprising:

(a) a nozzle positioned within the valve pocket and directed at an acute angle toward the intake valve comprising at least one opening for receiving air, connected to a first pathway, and at least one opening for expelling air, connected to a second pathway joined to the first pathway and extending to the expulsion opening, said first and second pathways providing a continuous channel for the flow of air from the air receiving opening to the expulsion opening wherein the first and second pathways are joined at a junction, said junction comprising a pair of opposed arcuate walls extending from the end of the first pathway remote from the air receiving opening to the end of the second pathway remote from the expulsion opening, through which the air travels from the expulsion opening past the intake valve into the combustion chamber; and (b) means for controlling the flow of air through the pathway and out the expulsion opening comprising:

(i) a stopper having sides complementary in shape to the pair of opposed arcuate walls movable from an open position allowing air through the pathway to a closed position wherein the sides of the stopper are in a sealed relationship with the opposed arcuate sides of the junction thereby preventing the flow of air through the second pathway and out the expulsion opening; and (ii) a means for determining the size and duration of the pathway opening.

4. The device of claim 3 wherein the size and number of receiving openings and the size of the expulsion opening is determined as a function of the cylinder displacement.

5. The device of claim 3 wherein the nozzle has at least four air receiving openings.

6. The device of claim 3 wherein the fuel is directed into the valve pocket by a fuel injector and wherein the expulsion opening is positioned in the valve pocket so that the air exiting the expulsion opening is in the path of the fuel discharged from the fuel injector.

7. The device of claim 3 wherein the power output of the engine at light loads is varied by varying the size and duration of the nozzle pathway opening.

8. An internal combustion engine as in claim 3 further comprising intake port, valve pockets and valve geometry modified to increase volumetric efficiency and maximize peak power output.

* * * * *